Aug. 4, 1959 D. G. HYMAS ET AL 2,898,455
DIVERSITY RECEIVER HAVING INDIVIDUALLY CONTROLLED CHANNEL TRIGGERS FOR COOPERATIVELY CONTROLLING CHANNEL SWITCHING
Filed Oct. 30, 1957
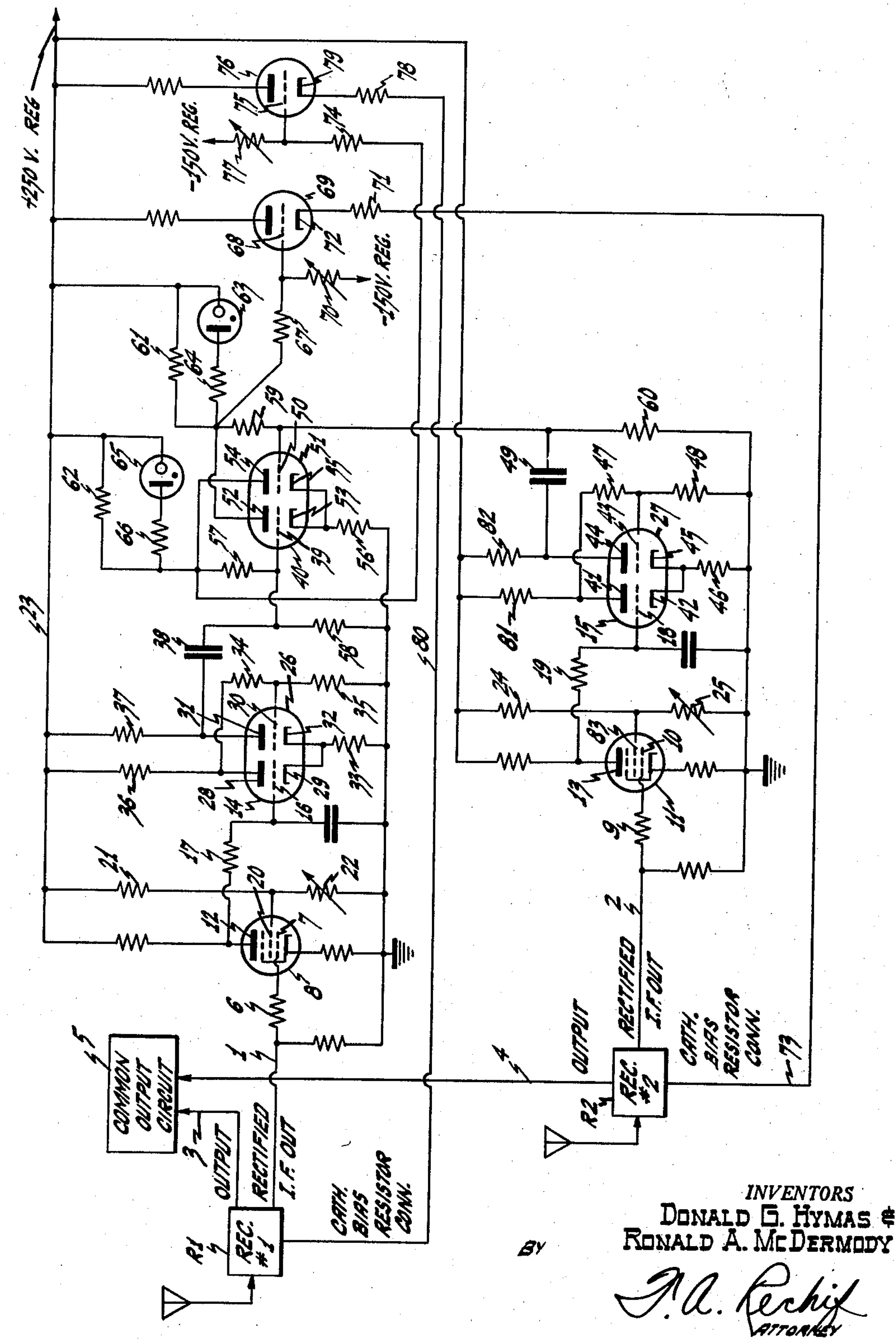
INVENTORS
DONALD G. HYMAS & RONALD A. McDERMODY
BY
F. A. Rechif
ATTORNEY United States Patent Office 2,898,455

Patented Aug. 4, 1959

2,898,455

DIVERSITY RECEIVER HAVING INDIVIDUALLY CONTROLLED CHANNEL TRIGGERS FOR COOPERATIVELY CONTROLLING CHANNEL SWITCHING

Donald G. Hymas, Haddonfield, N.J., and Ronald A. McDermody, Philadelphia, Pa., assignors to Radio Corporation of America, a corporation of Delaware Application October 30, 1957, Serial No. 693,445

14 Claims. (Cl. 250—20)

This invention relates to a switching system, and more particularly to a system for selectively switching either one of a pair of diversity receivers to a common output channel.

Diversity switching systems are known in which the strengths of the signals in two diversity receivers are continuously compared and that receiver having the stronger signal is switched to the common output channel. Systems of this type operate quite satisfactorily, but under certain conditions result in too frequent switching.

An object of this invention is to provide a novel switching system for diversity receivers.

Another object is to provide a diversity switching system in which selection of the desired diversity receiver is made on the basis of the last receiver in which the signal level has increased (or remained) above that required for minimum acceptable performance, that is, above a predetermined threshold level.

The objects of this invention are accomplished, briefly, in the following manner:

A first trigger circuit, for example, a Schmitt trigger circuit, is receptive of a signal proportional to the signal strength in the first of a pair of diversity receivers, and operates to develop a voltage pulse of one polarity, say negative, in response to each passage of the signal, in the direction of increasing amplitude, through a predetermined amplitude level or threshold level, and a voltage pulse of the opposite polarity in response to each passage of the signal through the threshold level, in the direction of decreasing amplitude. Similarly, a second trigger circuit is receptive of a signal proportional to the signal strength in the second of the pair of receivers, and operates to develop a voltage pulse of negative polarity in response to each passage of the signal applied thereto, in the direction of increasing amplitude, through a threshold level, and a voltage pulse of positive polarity in response to each passage of the signal applied thereto, in the direction of decreasing amplitude, through the threshold level. A bistable locking circuit or flip-flop circuit is receptive of the pulses developed by the first and second trigger circuits, and is operated in such a way that pulses of like polarities developed respectively by the first and second trigger circuits cause the locking circuit to be flipped to one or the other, respectively, of its two conditions of electrical stability. Circuitry coupled to the locking circuit is provided for switching one of the diversity receivers to the common output channel in response to the existence of one condition of electrical stability, and for switching the other of the diversity receivers to the common output channel in response to the existence of the other condition of electrical stability.

A detailed description of the invention follows, taken in conjunction with the accompanying drawing, wherein the single figure is a schematic diagram of a diversity switching system according to this invention.

As illustrated, two receivers R1 and R2 each fed by a separate antenna are arranged in diversity relation with respect to a remote transmitter, in such a way that the signal radiated from the remote transmitter is not expected to fade simultaneously in both receivers. The antennas may be arranged in space diversity (i.e., physically spaced apart), polarization diversity, or in some other manner such that each of the two receivers receives a different or diversified version of the same signal. Each receiver may include a mixer and high frequency oscillator (a common oscillator may be used for the two receivers), and a multistage intermediate frequency amplifier having say six stages. Each receiver may be arranged as disclosed in the Thompson Patent No. 2,691,065, for example, which discloses a repeater station arrangement, and as disclosed in said patent, a respective rectifier may be coupled to the fifth intermediate frequency stage of each receiver, to rectify the intermediate frequency energy in such stage. The rectified intermediate frequency output of receiver R1 will appear on lead 1, while the rectified intermediate frequency output of receiver R2 will appear on lead 2. The output of the aforementioned rectifier in receiver R1 is a direct current (D.C.) voltage proportional to the signal strength in receiver R1. Similarly, the output of the aforementioned rectifier in receiver R2 is a D.C. voltage proportional to the signal strength in receiver R2.

Each of the receivers R1 and R2 is provided with a built-in muting circuit (not shown) which operates to mute the corresponding receiver under fading conditions, that is, when the signal level or signal strength in the corresponding receiver falls below a certain threshold value. For purposes of clarity in explanation, it will be assumed that neither of the muting circuits has operated, and the description will proceed on the basis that neither of the receivers R1 or R2 is muted.

In each of the receivers R1 and R2, the output of the respective intermediate frequency amplifier is limited in two limiter stages (one of which stages will be referred to hereinafter), the output of receiver R1 appearing on lead 3 and the output of receiver R2 appearing on lead 4. Selective switching of the two receiver outputs is accomplished as described hereinafter, in such a way that either the output of receiver R1 (which will then appear on lead 3) or the output of receiver R2 (which will then appear on lead 4) is applied to the common output circuit or channel 5, to which leads 3 and 4 are both connected. The output circuit 5 may be part of the normal communication system used for bi-directional pick-up at repeater stations, such as the one disclosed in the aforementioned patent. As disclosed in the aforementioned patent, the output circuit 5 may include a discriminator (assuming that FM communication is being carried on), followed by one or more amplifiers and suitable signal utilization devices. The present invention discloses an arrangement for performing this selective switching of the output of receiver R1 or the output of receiver R2 to the common output channel 5, and at the same time for disconnecting the output of the other receiver from the common output channel. More particularly, the said selective switching is caused to occur in such a way that when the output of receiver R1 is switched to the common output channel and the output of the receiver R2 is disconnected from the common output channel, output appears on lead 3 and no output appears on lead 4; when the output of receiver R2 is switched to the common output channel 5 and the output of receiver R1 is disconnected from the common output channel, output appears on lead 4 and no output appears on lead 3. This will be more clearly understood as the description proceeds.

The D.C. voltage appearing on lead 1 (which voltage is proportional to the signal strength in receiver R1) is applied over a resistor 6 to the control grid 7 of a pentode electrode structure 8, which is connected as a D.C. amplifier. A signal in receiver R1 above the level required for minimum acceptable performance, which level may be thought of as the threshold level, will give a rectified voltage level on lead 1 of approximately 0.5 to 1.0 volt positive. Similarly, the D.C. voltage appearing on lead 2 (which voltage is proportional to the signal strength in receiver R2) is applied over a resistor 9 to the control grid 10 of a pentode electrode structure 11, which is connected as a D.C. amplifier. A signal in receiver R2 above the level required for minimum acceptable performance, which level may be thought of as the threshold level, will give a rectified voltage level on lead 2 of approximately 0.5 to 1.0 volt positive.

A voltage of approximately 0.5 to 1.0 volt positive, fed to grid 7 or to grid 10, will increase the anode current in the corresponding pentode vacuum tube or electrode structure 8 or 11 sufficiently so that the corresponding anode voltage (at anode 12 of structure 8 or at anode 13 of structure 11) will fall below the trigger level of the next stage (structure 14 connected to structure 8, or structure 15 connected to structure 11). The D.C. amplifier 8 is direct-coupled to the grid 16 of triode structure 14, by way of a resistor 17 connected between anode 12 and this grid. The D.C. amplifier 11 is direct-coupled to the grid 18 of triode structure 15, by way of a resistor 19 connected between anode 13 and this grid. The screen grid 20 of structure 8 is connected to an intermediate point on a voltage divider which comprises a fixed resistor 21 and an adjustable resistor 22 connected in series between the positive unidirectional voltage bus 23 and ground, which latter is the negative unidirectional voltage point. The adjustable resistor 22 (sensitivity control) in the circuit of screen grid 20 is used to set the anode voltage of structure 8 to the trigger level of the next stage 14, for the particular value of receiver threshold level desired. Similarly, the screen grid 83 of structure 11 is connected to an intermediate point on a voltage divider which comprises a fixed resistor 24 and an adjustable resistor 25 connected in series between the positive unidirectional voltage bus 23 and ground. The adjustable resistor 25 (sensitivity control) in the circuit of screen grid 83 is used to set the anode voltage of structure 11 to the trigger level of the next stage 15, for the particular value of receiver threshold level desired.

The evacuated triode electrode structure 14 is connected with another evacuated triode electrode structure 26 in a so-called Schmitt trigger circuit, which rapidly transfers from one stable state (in which structure 14 is conducting and structure 26 is cut off) to the other (in which structure 14 is cut off and structure 26 is conducting) as a rising signal on lead 1 reaches the trigger level of the trigger circuit 14, 26. The triode structures 14 and 26 may comprise the two triode electrode structures of a type 5687 vacuum tube. Similarly, the triode 15 is connected with another triode 27 in a Schmitt trigger circuit, which likewise has two stable limiting conditions and which triggers to one condition (structure 15 cut off and structure 27 conducting) when the input signal on lead 2 rises to a certain predetermined level (threshold level), and returns to its original condition (structure 15 conducting and structure 27 cut off) when the input signal on lead 2 is reduced to a certain level. The triode structures 15 and 27 may together comprise a type 5687 vacuum tube.

Both of the trigger circuits 14, 26 and 15, 27 are similar in construction and operation, so only the circuit 14, 26 will be described in detail. Triode structure 14 comprises, in addition to grid 16, an anode 28 and a cathode 29; structure 26 comprises a grid 30, an anode 31, and a cathode 32. The cathodes 29 and 32 are connected through a common cathode resistor 33 to ground. Anode 28 is connected through a resistor 34 to grid 30, and a resistor 35 is connected from grid 30 to ground. Anode 28 is supplied with energizing potential through a resistor 36 from the positive bus 23. Anode 31 is supplied with energizing potential through a resistor 37 from the positive bus 23.

The trigger circuit 14, 26 has two back-coupled triodes with direct couplings. One of these is a resistance coupling (resistor 34) between anode 28 and grid 30, while the other is the common cathode resistor 33, which is in the cathode circuits of both structures 14 and 26.

As previously stated, the rectified intermediate frequency voltage on lead 1 is positive with respect to ground. When this voltage is low, there is a minimum current flow in structure 8 and the voltage at anode 12 (which is applied to grid 16 by way of resistor 17) will have a maximum positive value. Since the grid 16 will then be at a maximum positive potential, the structure 14 will be conducting, and the anode current of structure 26 will be cut off by the voltage drop across resistor 33, applied to cathode 32, as well as by the low voltage at anode 28, which is applied to grid 30 by way of resistor 34.

When the signal level on lead 1 (which, it will be remembered, is proportional to the signal strength in receiver R1) rises above threshold (that is, when it reaches a voltage level of approximately 0.5 to 1.0 volt positive), the current flow in structure 8 increases. This increased current flow causes the voltage at anode 12 to decrease, so that the voltage on grid 16 will likewise decrease or fall. At the trigger level or trigger point (as determined by the circuit constants), the potential on grid 16 becomes sufficiently negative to reduce the anode current of triode structure 14 considerably, thus increasing the positive potential at anode 28, this increased potential being applied to grid 30 by way of resistor 34; also, the reduced anode current of structure 14 reduces the voltage drop across resistor 33 which, in turn, also increases the effective potential on grid 30. The increased potential on grid 30 increases the anode current of structure 26, the increased current flow through the common cathode resistor 33 then helping to cut off structure 14. The effect is thus a double-barrelled, cumulative one, and a very rapid change from one stable limiting condition (in which structure 14 is conducting and structure 26 is cut off) to the other (in which structure 14 is cut off and structure 26 is conducting) is obtained. In other words, at the trigger point or trigger level, as determined by the circuit constants, conduction in the tube 14, 26 will very rapidly shift from the structure 14 to the structure 26.

When the conduction shifts in a very rapid manner to structure 26, the voltage at anode 31 suddenly falls or drops due to the sudden establishment of current flow through such structure, producing a negative-going pulse at anode 31. This negative-going pulse can be fed through a capacitor 38 to the grid 39 of a triode vacuum tube electrode structure 40, resulting in a negative pulse at such grid.

When the signal level on lead 1 falls below threshold, that is, when it falls below a voltage level of approximately 0.5 to 1.0 volt positive, the current flow in structure 8 decreases. This decreased current flow causes the voltage at anode 12 to increase, so the voltage on grid 16 will likewise increase or rise. Reverse action now takes place in the trigger circuit 14, 26, and the trigger circuit rapidly changes back to its original stable limiting condition, wherein structure 14 is conducting and structure 26 is cut off. That is, conduction in the tube 14, 26 now very rapidly shifts from structure 26 to structure 14. When this very rapid shift occurs, the voltage at anode 31 suddenly increases due to the sudden cutoff of current flow through structure 26, producing a positive-going pulse at anode 31. This positive-going pulse can be fed through capacitor 38 to grid 39, resulting in a positive pulse at such grid.

To summarize the foregoing, the trigger circuit 14, 26 triggers in one direction (structure 14 cut off and structure 26 conducting) when the voltage on lead 1 (which is proportional to the signal strength in receiver R1) rises above the threshold level; thus, each time the signal strength in receiver R1 passes through the predetermined amplitude level or threshold level, in the direction of increasing amplitude, a negative pulse is produced at grid 39. The trigger circuit 14, 26 triggers in the reverse direction (structure 14 conducting and structure 26 cut off) when the voltage on lead 1 falls below the threshold level; thus, each time the signal strength in receiver R1 passes through the predetermined amplitude level or threshold level, in the direction of decreasing amplitude, a positive pulse is produced at grid 39.

As previously stated, the structures 15, 27 also comprise a Schmitt trigger circuit. Triode structure 15 comprises, in addition to grid 18, an anode 41 and a cathode 42; structure 27 comprises a grid 43, an anode 44, and a cathode 45. The cathodes 42 and 45 are connected through a common cathode resistor 46 to ground. Anode 41 is connected through a resistor 47 to grid 43, and a resistor 48 is connected from grid 43 to ground. Anode 41 is supplied with energizing potential through a resistor 81, from the positive bus 23. Anode 44 is supplied with energizing potential through a resistor 82 from the positive bus 23.

A capacitor 49 is connected between anode 44 and the grid 50 of a triode electrode structure 51. Structures 40 and 51 may comprise the two triode structures of a type 12AU7 vacuum tube.

The second trigger circuit 15, 27 operates similarly to the first trigger circuit 14, 26 previously described, but the second trigger circuit is operated in response to the voltage on lead 2. The trigger circuit 15, 27 triggers in one direction (structure 15 cut off and structure 27 conducting) when the voltage on lead 2 (which is proportional to the signal strength in receiver R2) rises above the threshold level; thus, each time the signal strength in receiver R2 passes through the predetermined amplitude level or threshold level, in the direction of increasing amplitude, a negative pulse is produced at grid 50. The trigger circuit 15, 27 triggers in the reverse direction (structure 15 conducting and structure 27 cut off) when the voltage on lead 2 falls below the threshold level; thus, each time the signal strength in receiver R2 passes through the predetermined amplitude level or threshold level, in the direction of decreasing amplitude, a positive pulse is produced at grid 50.

As a result of the action of trigger circuits 14, 26 and 15, 27, each time the signal strength in either of the two diversity receivers rises above threshold, a negative pulse will be produced, and each time the signal strength in either of the two diversity receivers falls below threshold, a positive pulse will be produced. The pulses for receiver R1 are applied to grid 39, and the pulses for receiver R2 are applied to grid 50.

The triode vacuum tube electrode structures 40 and 51 are connected to operate as a bistable locking circuit, which is a circuit having two conditions of electrical stability and comprising a pair of intercoupled electrode structures so arranged that the cessation of current in one structure causes a flow of current in the other structure, and vice versa. This locking circuit is quite similar to the so-called Eccles-Jordan circuit, and to the circuit disclosed in expired Patent No. 1,844,950.

Triode structure 40 comprises, in addition to grid 39, an anode 52 and a cathode 53; structure 51 comprises in addition to grid 50, an anode 54 and a cathode 55. The cathodes 53 and 55 are connected together and in turn are connected to ground through a resistor 56. The grid 39 is connected to the anode 54 through a resistor 57 and to ground through a resistor 58. The grid 50 is connected to the anode 52 through a resistor 59 and to ground through a resistor 60. The anodes 52 and 54 are connected to the positive bus 23 through resistors 61 and 62, respectively.

Neon indicator lamps are provided to indicate which of the two diversity receivers is supplying output. A neon lamp 63 is connected in series with a resistor 64 (which resistor may be built into the neon lamp socket) across resistor 61, so that this lamp is lighted when structure 40 is conducting and its anode current is flowing through resistor 61. A neon lamp 65 is connected in series with a resistor 66 (which resistor may be built into the neon lamp socket) across resistor 62, so that this lamp is lighted when structure 51 is conducting and its anode current is flowing through resistor 62.

The locking circuit 40, 51 has two conditions of electrical stability, in one of which structure 40 is conducting and structure 51 is cut off, and in the other of which structure 40 is cut off and structure 51 is conducting. This circuit is completely stable in either condition and will remain in either condition, once placed there, until changed therefrom by the application of a proper voltage. The locking circuit 40, 51 has two back-coupled or cross-coupled triodes with direct couplings. One of these is a resistance coupling (resistor 59) between anode 52 and grid 50, a second is a resistance coupling (resistor 57) between anode 54 and grid 39, and a third is the common cathode resistor 56, which is in the cathode circuits of both structures 40 and 51.

When the equipment is first turned on, one structure of the locking circuit 40, 51 will conduct while the other structure will be cut off, due to slight, unavoidable inequalities in the two circuits. Assume structure 40 is initially conducting. Now, if the signal strength in receiver R1 rises above threshold (that is, passes through the threshold level in a positive direction or in the direction of increasing amplitude), a negative pulse will be fed to grid 39, resulting from the action of trigger circuit 14, 26, as previously described. This negative pulse is of sufficient amplitude to cause a cessation of current flow in structure 40, and a consequent establishment of current flow in structure 51, because of the anode-to-grid cross couplings of these two structures. In other words, conduction in the tube 40, 51 shifts from structure 40 to structure 51. The voltage at anode 52 of structure 40 will, as a result, rise to essentially the voltage of bus 23, while the voltage at anode 54 of structure 51 will fall to approximately 100 volts, for example. This condition in tube 40, 51, whereby structure 40 is non-conducting and structure 51 is conducting, is one of the two conditions of electrical stability of the locking circuit 40, 51.

The increased voltage at anode 52 is direct-coupled through a resistive coupling 67 to the grid 68 of a triode vacuum tube structure 69 connected to operate as a cathode follower stage. This will increase the potential of grid 68. The structure 69 and the structure 11, together, may comprise a type 6U8 vacuum tube. Grid 68 is connected through an adjustable resistor 70 (the "bias No. 2" adjustment) to the negative terminal of a bias potential source of 150 volts, the positive terminal of which is grounded.

The increased potential on grid 68 will cause conduction in structure 69. The anode current of this structure flows through a resistor 71 which is connected in series in the lead from cathode 72 of this structure, and also through a lead 73 which is the cathode bias resistor connection of receiver R2. Lead 73 is series-connected to a bias resistor in the cathode circuit of the second limiter in receiver R2, in such a way that a D.C. current on the order of twenty milliamperes (which will be the value of anode current of structure 69 when this structure conducts) flowing through lead 73 and also through this cathode bias resistor develops a voltage across the cathode bias resistor which is sufficient to cut off the second limiter of receiver R2. By cutting off the second limiter of receiver R2, such receiver is effectively cut off from the common output channel 5, that is, in this case the output of receiver R2 will be effectively disconnected from output lead 4.

The decreased voltage at anode 54 is direct-coupled through a resistive coupling 74 to the grid 75 of a triode vacuum tube structure 76 connected to operate as a cathode follower stage. This will decrease the potential of grid 75. The structure 76 and the structure 8, together, may comprise a type 6U8 vacuum tube. Grid 75 is connected through an adjustable resistor 77 (the "bias No. 1" adjustment) to the negative terminal of the 150-volt bias potential source.

The decreased potential on grid 75 will cut off structure 76, thus removing the cut-off bias which had been applied to receiver R1 by current flow through this structure. This cut-off bias on receiver R1 due to current flow through structure 76 comes about by reason of the following. When anode current flows through structure 76, such current flows through a resistor 78 which is connected in series in the lead from cathode 79 of this structure, and also through a lead 80 which is the cathode bias resistor connection of receiver R1. Lead 80 is series-connected to a bias resistor in the cathode circuit of the second limiter in receiver R1, in such a way that a D.C. current on the order of twenty milliamperes (which will be the value of anode current of structure 76 when this structure conducts) flowing through lead 80 and also through this cathode bias resistor develops a voltage across the cathode bias resistor which is sufficient to cut off the second limiter of receiver R1. By cutting off such second limiter, receiver R1 is effectively cut off from the common output channel 5.

By cutting off structure 76 in the manner described in the preceding paragraph, no current will flow through lead 80 and the cathode bias resistor in receiver R1, so receiver R1 is no longer cut off or biased off, and the same will now pass signal. In this case, therefore, the output of receiver R1 will be switched to output lead 4, and to the common output channel 5.

As a result of the foregoing action, then, receiver R2 is disconnected from the output channel 5, and receiver R1 is switched to such channel.

The conduction having been shifted from structure 40 to structure 51, current flow through resistor 62 produces a voltage drop thereacross sufficient to light neon lamp 65, the "receiver No. 1" indicator. This indicates that receiver R1 is now supplying output.

If now the signal strength in receiver R2 rises above threshold, a negative pulse will be fed to grid 50, resulting from the action of trigger circuit 15, 27, as previously described. This negative pulse trips the locking circuit 40, 51 to its (original) condition of electrical stability, wherein structure 51 is cut off and structure 40 is conducting. The cutting off of structure 51 causes the voltage at anode 54 and at grid 75 to rise, while the conduction of structure 40 causes the voltage at anode 52 and at grid 68 to fall. The rising voltage at grid 75 causes structure 76 to conduct, cutting off or disconnecting receiver R1 from its output lead 3 and from common output channel 5, while the falling voltage at grid 68 cuts off structure 69, removing the cut-off bias from receiver R2 and turning on this receiver. Now, receiver R1 is disconnected from the output channel 5 and receiver R2 is switched to such channel.

The conduction having now been shifted from structure 51 to structure 40, current flow through resistor 61 produces a voltage drop thereacross sufficient to light neon lamp 63, the "receiver No. 2" indicator. This indicates that receiver R2 is now supplying output.

If receiver R2 is providing output and receiver R1 is disconnected from the output channel, as just described, and the signal strength in receiver R2 falls below threshold, switching will occur, so that the last receiver in which the signal level has remained above threshold (in this case, receiver R1) is selected. This comes about in the following way. When receiver R2 is providing output, structures 51 and 69 are cut off, and structures 40 and 76 are conducting. When the signal strength in R2 falls below threshold, a positive pulse will be fed to grid 50. This pulse trips the locking circuit 40, 51 to the condition wherein structure 51 is conducting and structure 40 is cut off. The conduction of structure 51 causes the voltage at anode 54 and at grid 75 to fall, while the cutting off of structure 40 causes the voltage at anode 52 and at grid 68 to rise. These effects cut off structure 76 and turn on structure 69. The cutting off of structure 76 removes the cut-off bias from R1 and switches this receiver to the output channel 5. The conduction of structure 69 applies cut-off bias to R2, disconnecting this receiver from output channel 5.

If receiver R2 is providing output and receiver R1 is disconnected from the output channel, and the signal strength in receiver R1 falls below threshold, no switching will occur. This is because, when the receiver R1 signal falls below threshold, a positive pulse is applied to grid 39 of structure 40. However, structure 40 is already conducting, so this positive pulse is ineffective to change the conditions of conduction in any of the structures 40, 51, 69, or 76.

From the above description, it may be seen that the diversity receiver whose signal strength rises above the threshold point last will be the receiver providing output to the common output channel 5. In other words, selection of the desired diversity receiver output is made on the basis of the last receiver in which the signal level has increased (or remainder) above that required for minimum acceptable performance, that is, above a predetermined threshold level.

If receiver R1 is providing output (in which situation structures 51 and 69 are conducting, and structures 40 and 76 are cut off or nonconducting), and its signal strength falls below the threshold setting, the action of the switching system of this invention is such as to switch receiver R2 to the output circuit 5 and to disconnect receiver R1 therefrom. This may be seen from the following. If the signal strength in receiver R1 falls below threshold, a positive pulse is applied to grid 39 of structure 40. This trips the locking circuit 40, 51, turning on structure 40 and cutting off structure 51. The decreased potential at anode 52 and at grid 68 cuts off structure 69, removing the cut-off bias from receiver R2 and switching this receiver to the output circuit 5. The increased potential at anode 54 and at grid 75 turns on structure 76, applying a cutoff bias to receiver R1 and disconnecting this receiver from the output circuit 5.

The diversity switching system of this invention functions to switch the output channel 5 to the receiver whose signal strength rises above the sensitivity setting to which the system has been set, and to switch the output channel 5 from the receiver whose signal strength falls below this setting. Under conditions where the signal strengths of both receivers rise and fall nearly alike, the receiver which (in either direction) last crosses the threshold setting, determines the condition of operation of the switching system, and the receiver through which signal will be passed to the common output channel 5.

There remains for discussion one other situation which may arise. As previously described, if receiver R2 is providing output and receiver R1 is disconnected (in which situation structures 51 and 69 are cut off or nonconducting and structures 40 and 76 are conducting), and if the signal strength in receiver R1 falls below threshold, no switching will occur, for this would apply a positive pulse to grid 39 of structure 40, which is already conducting. Now, if the signal strength in receiver R2 falls below threshold while that in receiver R1 remains below threshold, the following switching action occurs. In response to the receiver R2 signal strength falling below threshold, a positive pulse is applied to grid 50 of structure 51. This trips the locking circuit 40, 51, turning on structure 51 and cutting off structure 40. The decreased potential at anode 54 and at grid 75 cuts off structure 76, connecting the output of receiver R1 to output lead 3. The increased potential at anode 52 and at grid 68 turns on structure 69, disconnecting receiver R2 from the output circuit 5. Under these conditions, the output of a receiver (R1) whose signal strength is below threshold would tend to be supplied to output channel 5, which of course is undesirable.

Under these conditions, however, the built-in muting circuits previously referred to come into play. The muting circuits in receivers R1 and R2 have both now acted, to mute both of these receivers, since their signal strengths are both now below threshold. Thus, the output of receiver R1 is now muted and cannot reach output channel 5, even though the switching circuit of this invention has operated to remove the cutoff bias from this same receiver. Thus, the diversity switching system of this invention functions to insure that one receiver (that particular receiver which last increased, or remained above, the threshold level) will be available for output when (but only when) the signal level in the selected receiver is above threshold.

The following values for certain of the components are given by way of example. These were the values used in a circuit according to this invention which was built and successfully tested.

| | | | |
|---|---|---|---|
| Resistor: | 6 | ohms | 100,000 |
| | 9 | do | 100,000 |
| | 17 | do | 100,000 |
| | 19 | do | 100,000 |
| | 21 | do | 47,000 |
| | 24 | do | 47,000 |
| | 33 | do | 33,000 |
| | 34 | do | 820,000 |
| | 35 | megohm | 1 |
| | 36 | ohms | 4,700 |
| | 37 | do | 10,000 |
| | 46 | do | 33,000 |
| | 47 | do | 820,000 |
| | 48 | megohm | 1 |
| | 56 | ohms | 4,700 |
| | 57 | megohms | 1.8 |
| | 58 | ohms | 470,000 |
| | 59 | megohms | 1.8 |
| | 60 | ohms | 470,000 |
| | 67 | do | 820,000 |
| | 74 | do | 820,000 |
| | 81 | do | 4,700 |
| | 82 | do | 10,000 |
| Capacitor: | 38 | mmfd. | 6,800 |
| | 49 | mmfd. | 6,800 |

What is claimed is:

1. In a system for selectively switching either one of a pair of receivers to a common output channel, said receivers being arranged in diversity relation relative to a remotely located transmitter, first means receptive of solely a signal proportional to the signal strength in the first receiver for developing a voltage pulse of one polarity in response to each passage of said signal through a predetermined amplitude level in the direction of increasing amplitude; second means independent of said first means and receptive of solely a signal proportional to the signal strength in the second receiver for developing a voltage pulse of said one polarity in response to each passage of said last-mentioned signal through a predetermined amplitude level in the direction of increasing amplitude; and means receptive of the pulses developed by said first and said second means for switching said first receiver to said output channel in response to a pulse of said one polarity developed by said first means and for switching said second receiver to said output channel in response to a pulse of said one polarity developed by said second means.

2. In a system for selectively switching either one of a pair of receivers to a common output channel, said receivers being arranged in diversity relation relative to a remotely located transmitter, first means receptive of solely a signal proportional to the signal strength in the first receiver for developing a voltage pulse of one polarity in response to each passage of said signal through a predetermined amplitude level in the direction of increasing amplitude; second means independent of said first means and receptive of solely a signal proportional to the signal strength in the second receiver for developing a voltage pulse of said one polarity in response to each passage of said last-mentioned signal through a predetermined amplitude level in the direction of increasing amplitude; and means receptive of the pulses developed by said first and said second means for switching said first receiver to said output channel and for disconnecting said second receiver from said output channel in response to a pulse of said one polarity developed by said first means, and for switching said second receiver to said output channel and for disconnecting said first receiver from said output channel in response to a pulse of said one polarity developed by said second means.

3. In a system for selectively switching either one of a pair of receivers to a common output channel, said receivers being arranged in diversity relation relative to a remotely located transmitter, first means receptive of solely a signal proportional to the signal strength in the first receiver for developing a voltage pulse of one polarity in response to each passage of said signal through a predetermined amplitude level in the direction of increasing amplitude and a voltage pulse of the opposite polarity in response to each passage of said signal through said level in the direction of decreasing amplitude; second means independent of said first means and receptive of solely a signal proportional to the signal strength in the second receiver for developing a voltage pulse of said one polarity in response to each passage of said last-mentioned signal through a predetermined amplitude level in the direction of increasing amplitude and a voltage pulse of said opposite polarity in response to each passage of said last-mentioned signal through said last-mentioned level in the direction of decreasing amplitude; and means receptive of the pulses developed by said first and said second means for switching said second receiver to said output channel in response to a pulse of said opposite polarity developed by said first means, provided that said second receiver is not already switched to said output channel, and for switching said first receiver to said output channel in response to a pulse of said opposite polarity developed by said second means, provided that said first receiver is not already switched to said output channel.

4. In a system for selectively switching either one of a pair of receivers to a common output channel, said receivers being arranged in diversity relation relative to a remotely located transmitter, first means receptive of solely a signal proportional to the signal strength in the first receiver for developing a voltage pulse of one polarity in response to each passage of said signal through a predetermined amplitude level in the direction of increasing amplitude and a voltage pulse of the opposite polarity in response to each passage of said signal through said level in the direction of decreasing amplitude; second means independent of said first means and receptive of solely a signal proportional to the signal strength in the second receiver for developing a voltage pulse of said one polarity in response to each passage of said last-mentioned signal through a predetermined amplitude level in the direction of increasing amplitude and a voltage pulse of said opposite polarity in response to each passage of said last-mentioned signal through said last-mentioned level in the direction of decreasing amplitude; and means receptive of the pulses developed by said first and said second means for switching said first receiver to said output channel in response to a pulse of said one polarity developed by said first means and for switching said second receiver to said output channel in response to a pulse of said opposite polarity developed by said first means, provided that said second receiver is not already switched to said output channel, said last-mentioned means also operating to switch said second receiver to said output channel in response to a pulse of said one polarity developed by said second means and to switch said first receiver to said output channel in response to a pulse of said opposite polarity developed by said second means, provided that said first receiver is not already switched to said output channel.

5. In a system for selectively switching either one of a pair of receivers to a common output channel, said receivers being arranged in diversity relation relative to a remotely located transmitter, first means receptive of solely a signal proportional to the signal strength in the first receiver for developing a voltage pulse of one polarity in response to each passage of said signal through a predetermined amplitude level in the direction of increasing amplitude; second means independent of said first means and receptive of solely a signal proportional to the signal strength in the second receiver for developing a voltage pulse of said one polarity in response to each passage of said last-mentioned signal through a predetermined amplitude level in the direction of increasing amplitude; a locking circuit having two conditions of electrical stability and comprising a pair of intercoupled electrode structures so arranged that the cessation of current in one structure causes a flow of current in the other structure, and vice versa; means for applying the pulses developed by said first means to one of said structures to control the flow of current therein, and means for applying the pulses developed by said second means to the other of said structures to control the flow of current therein.

6. In a system for selectively switching either one of a pair of receivers to a common output channel, said receivers being arranged in diversity relation relative to a remotely located transmitter, first means receptive of solely a signal proportional to the signal strength in the first receiver for developing a voltage pulse of negative polarity in response to each passage of said signal through a predetermined amplitude level in the direction of increasing amplitude; second means independent of said first means and receptive of solely a signal proportional to the signal strength in the second receiver for developing a voltage pulse of negative polarity in response to each passage of said last-mentioned signal through a predetermined amplitude level in the direction of increasing amplitude; and means receptive of the pulses developed by said first and said second means for switching said first receiver to said output channel in response to a pulse of negative polarity developed by said first means and for switching said second receiver to said output channel in response to a pulse of negative polarity developed by said second means.

7. In a system for selectively switching either one of a pair of receivers to a common output channel, said receivers being arranged in diversity relation relative to a remotely located transmitter, first means receptive of solely a signal proportional to the signal strength in the first receiver for developing a voltage pulse of negative polarity in response to each passage of said signal through a predetermined amplitude level in the direction of increasing amplitude; second means independent of said first means and receptive of solely a signal proportional to the signal strength in the second receiver for developing a voltage pulse of negative polarity in response to each passage of said last-mentioned signal through a predetermined amplitude level in the direction of increasing amplitude; and means receptive of the pulses developed by said first and second means for switching said first receiver to said output channel and for disconnecting said second receiver from said output channel in response to a pulse of negative polarity developed by said first means, and for switching said second receiver to said output channel and for disconnecting said first receiver from said output channel in response to a pulse of negative polarity developed by said second means.

8. In a system for selectively switching either one of a pair of receivers to a common output channel, said receivers being arranged in diversity relation relative to a remotely located transmitter, first means receptive of solely a signal proportional to the signal strength in the first receiver for developing a voltage pulse of negative polarity in response to each passage of said signal through a predetermined level in the direction of increasing amplitude and a voltage pulse of positive polarity in response to each passage of said signal through said level in the direction of decreasing amplitude; second means independent of said first means and receptive of solely a signal proportional to the signal strength in the second receiver for developing a voltage pulse of negative polarity in response to each passage of said last-mentioned signal through a predetermined amplitude level in the direction of increasing amplitude and a voltage pulse of positive polarity in response to each passage of said last-mentioned signal through said last-mentioned level in the direction of decreasing amplitude; and means receptive of the pulses developed by said first and said second means for switching said first receiver to said output channel in response to a pulse of negative polarity developed by said first means and for switching said second receiver to said output channel in response to a pulse of positive polarity developed by said first means, provided that said second receiver is not already switched to said output channel, said last-mentioned means also operating to switch said second receiver to said output channel in response to a pulse of negative polarity developed by said second means and to switch said first receiver to said output channel in response to a pulse of positive polarity developed by said second means, provided that said first receiver is not already switched to said output channel.

9. In a system for selectively switching either one of a pair of receivers to a common output channel, said receivers being arranged in diversity relation relative to a remotely located transmitter, first means receptive of solely a signal proportional to the signal strength in the first receiver for developing a voltage pulse of one polarity in response to each passage of said signal through a predetermined amplitude level in the direction of increasing amplitude; second means independent of said first means and receptive of solely a signal proportional to the signal strength in the second receiver for developing a voltage pulse of said one polarity in response to each passage of said last-mentioned signal through a predetermined amplitude level in the direction of increasing amplitude; a locking circuit having two conditions of electrical stability and comprising a pair of intercoupled electrode structures so arranged that the cessation of current in one structure causes a flow of current in the other structure, and vice versa; means for applying the pulses developed by said first means to one of said structures to control the flow of current therein, means for applying the pulses developed by said second means to the other of said structures to control the flow of current therein, means acting in response to the existence of one stable condition in said locking circuit for controlling the switching of one of said receivers to said output channel, and means acting in response to the existence of the other stable condition in said locking circuit for controlling the switching of the other of said receivers to said output channel.

10. In a system for selectively switching either one of a pair of receivers to a common output channel, said receivers being arranged in diversity relation relative to a remotely located transmitter, first means receptive of solely a signal proportional to the signal strength in the first receiver for developing a voltage pulse of one polarity in response to each passage of said signal through a predetermined amplitude level in the direction of increasing amplitude; second means independent of said first means and receptive of solely a signal proportional to the signal strength in the second receiver for developing a voltage pulse of said one polarity in response to each passage of said last-mentioned signal through a predetermined amplitude level in the direction of increasing amplitude; a locking circuit having two conditions of electrical stability and comprising a pair of intercoupled electrode structures so arranged that the cessation of current in one structure causes a flow of current in the other structure, and vice versa; means for applying the pulses developed by said first means to one of said structures to cut off the flow of current therein, thereby establishing the flow of current in the other of said structures, in response to a pulse of said one polarity, means for aplying the pulses developed by said second means to said other structure to cut off the flow of current therein, thereby establishing the flow of current in said one structure, in response to a pulse of said one polarity, means acting in response to the establishment of current flow in one of said structures to switch one of said receivers to said output channel, and means acting in response to the establishment of current flow in the other of said structures to switch the other of said receivers to said output channel.

11. In a system for selectively switching either one of a pair of receivers to a common output channel, said receivers being arranged in diversity relation relative to a remotely located transmitter, first means receptive of solely a signal proportional to the signal strength in the first receiver for developing a voltage pulse of one polarity in response to each passage of said signal through a predetermined amplitude level in the direction of increasing amplitude; second means independent of said first means and receptive of solely a signal proportional to the signal strength in the second receiver for developing a voltage pulse of said one polarity in response to each passage of said last-mentioned signal through a predetermined amplitude level in the direction of increasing amplitude; a locking circuit having two conditions of electrical stability and comprising a pair of intercoupled electrode structures so arranged that the cessation of current in one structure causes a flow of current in the other structure, and vice versa; means for applying the pulses developed by said first means to one of said structures to cut off the flow of current therein, thereby establishing the flow of current in the other of said structures, in response to a pulse of said one polarity, means for applying the pulses developed by said second means to said other structure to cut off the flow of current therein, thereby establishing the flow of current in said one structure, in response to a pulse of said one polarity, means acting in response to the cessation of current flow in said one structure to disconnect said second receiver from said output channel and acting in response to the establishment of current flow in said one structure to switch said second receiver to said output channel, and means acting in response to the cessation of current flow in said other structure to disconnect said first receiver from said output channel and acting in response to the establishment of current flow in said other structure to switch said first receiver to said output channel.

12. In a system for selectively switching either one of a pair of receivers to a common output channel, said receivers being arranged in diversity relation relative to a remotely located transmitter, a first trigger circuit receptive of solely a signal proportional to the signal strength in the first receiver and operating to develop at its output a voltage pulse of one polarity in response to each passage of said signal through a predetermined amplitude level in the direction of increasing amplitude; a second trigger circuit receptive of solely a signal proportional to the signal strength in the second receiver and operating to develop at its output a voltage pulse of said one polarity in response to each passage of said last-mentioned signal through a predetermined amplitude level in the direction of increasing amplitude; and means coupled to the outputs of said first and second trigger circuits for switching said first receiver to said output channel in response to a pulse of said one polarity developed by said first trigger circuit and for switching said second receiver to said output channel in response to a pulse of said one polarity developed by said second trigger circuit.

13. In a system for selectively switching either one of a pair of receivers to a common output channel, said receivers being arranged in diversity relation relative to a remotely located transmitter, a first trigger circuit receptive of solely a signal proportional to the signal strength in the first receiver and operting to develop at its output a voltage pulse of one polarity in response to each passage of said signal through a predetermined amplitude level in the direction of increasing amplitude; a second trigger circuit receptive of solely a signal proportional to the signal strength in the second receiver and operating to develop at its output a voltage pulse of said one polarity in response to each passage of said last-mentioned signal through a predetermined amplitude level in the direction of increasing amplitude; a locking circuit having two conditions of electrical stability and comprising a pair of intercoupled electrode structures so arranged that the cessation of current in one structure causes a flow of current in the other structure, and vice versa; means for applying the pulses developed by said first trigger circuit to one of said structures to control the flow of current therein, means for applying the pulses developed by said second trigger circuit to the other of said structures to control the flow of current therein, means acting in response to the existence of one stable condition in said locking circuit for controlling the switching of one of said receivers to said output channel, and means acting in response to the existence of the other stable condition in said locking circuit for controlling the switching of the other of said receivers to said output channel.

14. In a system for selectively switching either one of a pair of receivers to a common output channel, said receivers being arranged in diversity relation relative to a remotely located transmitter, a first trigger circuit receptive of solely a signal proportional to the signal strength in the first receiver and operating to develop at its output a voltage pulse of one polarity in response to each passage of said signal through a predetermined amplitude level in the direction of increasing amplitude; a second trigger circuit receptive of solely a signal proportional to the signal strength in the second receiver and operating to develop at its output a voltage pulse of said one polarity in response to each passage of said last-mentioned signal through a predetermined amplitude level in the direction of increasing amplitude; a locking circuit having two conditions of electrical stability and comprising a pair of intercoupled electrode structures so arranged that the cessation of current in one structure causes a flow of current in the other structure, and vice versa; means for applying the pulses developed by said first trigger circuit to one of said structures to cut off the flow of current therein in response to a pulse of said one polarity, means for applying the pulses developed by said second trigger circuit to the other of said structures to cut off the flow of current therein in response to a pulse of said one polarity, means acting in response to the cessation of current flow in said one structure to disconnect said second receiver from said output channel, and means acting in response to the cessation of current flow in said other structure to disconnect said first receiver from said output channel.

References Cited in the file of this patent

UNITED STATES PATENTS

| | | |
|---|---|---|
| 2,644,885 | Atwood | July 7, 1953 |
| 2,685,643 | Fisk et al. | Aug. 3, 1954 |

OTHER REFERENCES

"Electronic Diversity Switching," Wireless World, November 1949, pp. 414 to 418.